United States Patent
Vescovini et al.

(10) Patent No.: US 8,670,901 B2
(45) Date of Patent: Mar. 11, 2014

(54) BRAKE AND STEER-BY-BRAKING (SFB) PEDAL ARRANGEMENT FOR TRACTORS

(75) Inventors: Maurizio Vescovini, Modena (IT); Riccardo Morselli, Modens (IT)

(73) Assignee: CNH America LLC, New Holland, PA (US)

( * ) Notice: Subject to any disclaimer, the term of this patent is extended or adjusted under 35 U.S.C. 154(b) by 573 days.

(21) Appl. No.: 12/918,796

(22) PCT Filed: Feb. 11, 2009

(86) PCT No.: PCT/EP2009/051596
§ 371 (c)(1),
(2), (4) Date: Nov. 17, 2010

(87) PCT Pub. No.: WO2009/103648
PCT Pub. Date: Aug. 27, 2009

(65) Prior Publication Data
US 2011/0066328 A1    Mar. 17, 2011

(30) Foreign Application Priority Data
Feb. 21, 2008  (EP) ..................................... 08425109

(51) Int. Cl.
*G06F 19/00*    (2011.01)
*B60T 11/24*    (2006.01)

(52) U.S. Cl.
USPC ................. 701/41; 701/83; 74/512; 180/244; 180/247

(58) Field of Classification Search
USPC ........... 303/961; 188/354; 701/41, 71, 83, 78; 74/512; 180/244, 247
See application file for complete search history.

(56) References Cited

U.S. PATENT DOCUMENTS

| | | | | | |
|---|---|---|---|---|---|
| 2,362,521 | A | * | 11/1944 | Acton | 180/6.3 |
| 3,400,788 | A | * | 9/1968 | Brace | 188/354 |
| 4,702,330 | A | * | 10/1987 | Vatter et al. | 180/6.2 |
| 4,951,775 | A | * | 8/1990 | Kittle et al. | 180/244 |
| 4,953,917 | A | * | 9/1990 | Wittich | 303/9.61 |

* cited by examiner

*Primary Examiner* — Ronnie Mancho
(74) *Attorney, Agent, or Firm* — Sue C. Watson; Patrick Sheldrake

(57) ABSTRACT

A brake and steer-by-braking pedal arrangement for tractors includes a right pedal and a left pedal operating synchronously or diachronically; and at least one hydraulic or pneumatic circuit connected to one master cylinder activated by at least one of the pedals. The pedal arrangement also has potentiometers connected electronically to an electronic central control unit and the potentiometers determine the distance between the pedals The electronic central control unit determines, on the basis of data received from the potentiometers, whether or not to activate the steer-by-braking function.

11 Claims, 2 Drawing Sheets

BRAKE AND STEER-BY-BRAKING (SFB) PEDAL ARRANGEMENT FOR TRACTORS

The present invention relates to a brake and steer-by-braking pedal arrangement for tractors.

As is known, conventional tractors are equipped with a brake and steer-by-braking pedal arrangement, normally comprising two brake pedals enabling a so-called steer-by-braking function (SBF).

In this type of brake pedal arrangement, if the driver presses the left (or right) pedal only, the brake system only brakes the rear left (or right) wheel, thus reducing the turn radius of the tractor, especially during headland manoeuvres.

At present, the two brake pedals simply have a driver-operated mechanical lock device for integrally connecting the pedals for on-road use or when the SBF is not required.

The mechanical lock should always be used when running on-road, to safeguard against the driver inadvertently pressing only one of the two pedals when the tractor is running at high speed, thus resulting in sharp swerving and possible capsizing of the vehicle.

When running on-road, the two brake pedals are connected integrally by the lock device, and can only be pressed simultaneously to slow down or stop the vehicle as a whole.

This long-standing solution, however, has two main drawbacks:

(1) the driver may neglect to activate the lock device to connect the two brake pedals integrally before the vehicle gets up to speed, thus resulting, as stated, in highly dangerous situations in the event of emergency braking (swerving of the vehicle at high speed, if only one pedal is pressed);

(2) using current systems, the steer-by-braking function (SBF) cannot be applied effectively to electronic (e.g. ABS) brake systems.

Moreover, in current SBF systems, each pedal has a respective master cylinder, so the hydraulic circuits of the two master cylinders must be connected by a compensating valve to compensate any difference in pressure between the two hydraulic circuits when braking the tractor normally; all of which seriously complicates the hydraulic circuits of the tractor brake system.

It is therefore the main object of the present invention to provide a tractor pedal arrangement designed to eliminate the aforementioned drawbacks, and which at the same time is cheap and easy to produce.

It is a further object of the present invention to provide an electronically controlled, in particular ABS, brake system comprising at least one innovative tractor pedal arrangement.

According to the present invention, there is provided a tractor pedal arrangement as claimed in the accompanying Claims.

A non-limiting embodiment of the present invention will be described by way of example with reference to the accompanying drawings, in which.

Figure 1:
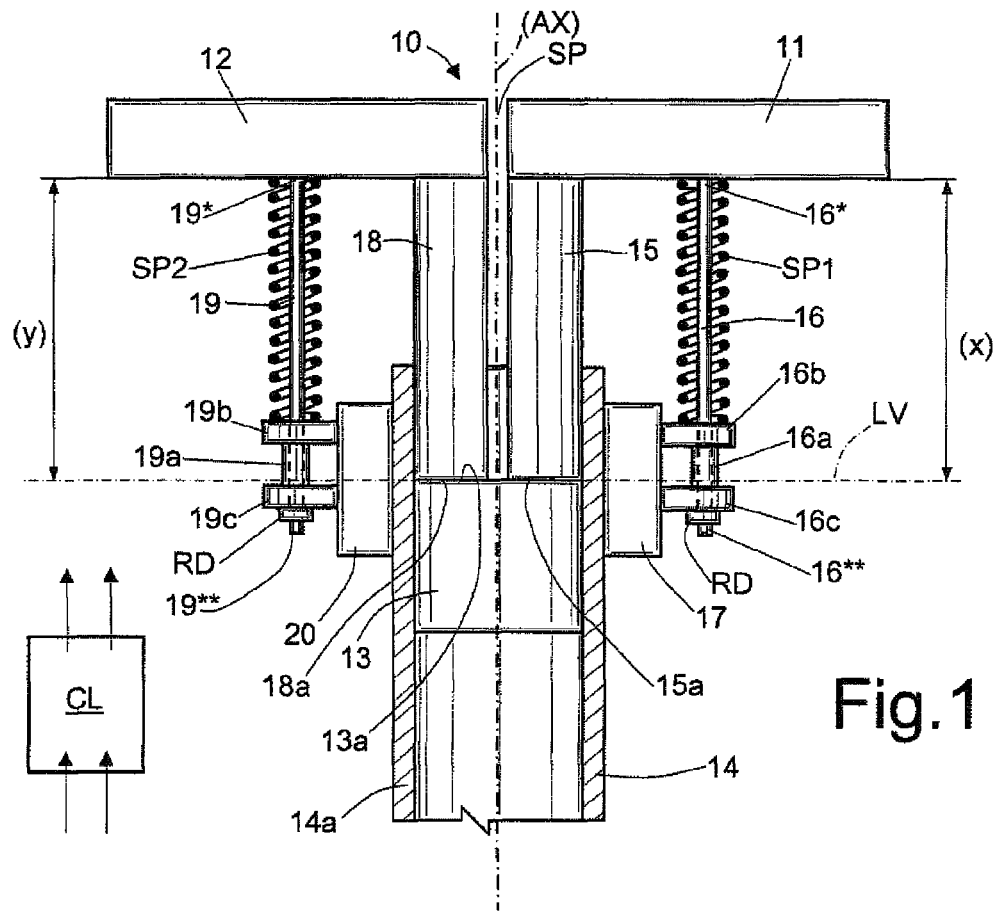
FIG. 1 shows a longitudinal section of a pedal arrangement in accordance with the present invention in a first rest position.

As shown in FIG. 1, the pedal arrangement 10 according to the present invention comprises a right pedal 11 and a left pedal 12, which act (synchronously or diachronically) on a single master cylinder 13 housed in sliding manner inside a cylindrical guide 14.

Pedals 11, 12 are located on opposite sides of a longitudinal axis of symmetry (AX) of pedal arrangement 10 as a whole.

Right pedal 11 is connected mechanically to master cylinder 13 by a respective push-rod 15 guided at least partly, and also in sliding manner, inside cylindrical guide 14 of master cylinder 13.

In the rest position shown in FIG. 1, the bottom surface 15a of push-rod 15 rests on the top surface 13a of master cylinder 13.

In the FIG. 1 rest position, the top surface 13a of master cylinder 13 is also aligned with a fixed reference line LV.

Right pedal 11 is fitted with a control rod 16 for controlling a respective right potentiometer 17.

In actual use, control rod 16 controlling potentiometer 17 slides inside a sleeve 16a fitted integrally to potentiometer 17 by two supports 16b, 16c with holes. A first end 16* of control rod 16 is fixed to pedal 11, and a second end 16** is fitted, by known means not shown, with a retaining washer RD.

Control rod 16 is inserted inside a respective helical spring SP1 located between pedal 11 and support 16b, and which restores pedal 11 to the FIG. 1 position when foot pressure is applied by the driver and then released from pedal 11.

Similarly, left pedal 12 is connected mechanically to master cylinder 13 by a respective push-rod 18 also guided at least partly inside cylindrical guide 14.

In the rest position shown in FIG. 1, the bottom surface 18a of push-rod 18 rests on the top surface 13a of master cylinder 13.

A gap SP is left, along axis (AX), between the two pedals 11, 12.

Left pedal 12 is fitted with a control rod 19 for controlling a respective left potentiometer 20.

In actual use, control rod 19 controlling potentiometer 20 slides inside a sleeve 19a fitted integrally to potentiometer 20 by two supports 19b, 19c with holes. A first end 19* of control rod 19 is fixed to pedal 12, and a second end 19** is fitted, by known means not shown, with a retaining washer RD.

Control rod 19 is inserted inside a respective helical spring SP2 located between pedal 12 and support 19b, and which restores pedal 12 to the FIG. 1 position when foot pressure is applied by the driver and then released from pedal 12.

In the embodiment shown in the attached drawings, the two potentiometers 17, 20 are fixed to the outer surface of cylindrical guide 14.

As will be clear to anyone skilled in the art, potentiometers 17 and 20 may be replaced by any other mechanical, electromechanical or electronic device capable of determining the instantaneous position of pedals 11 and 12, or the distance between them, or the distance between them and fixed reference line LV.

As stated, potentiometers 17 and 20 provide for determining the distance (X) of right pedal 11 and the distance (Y) of left pedal 12 from fixed reference line LV respectively.

The values of distances (X) and (Y) are transmitted in signal form to an electronic central control unit CL, which processes the incoming data and implements control strategies by which to control the hydraulic circuit (not shown) of master cylinder 13 (see below).

Figure 2:
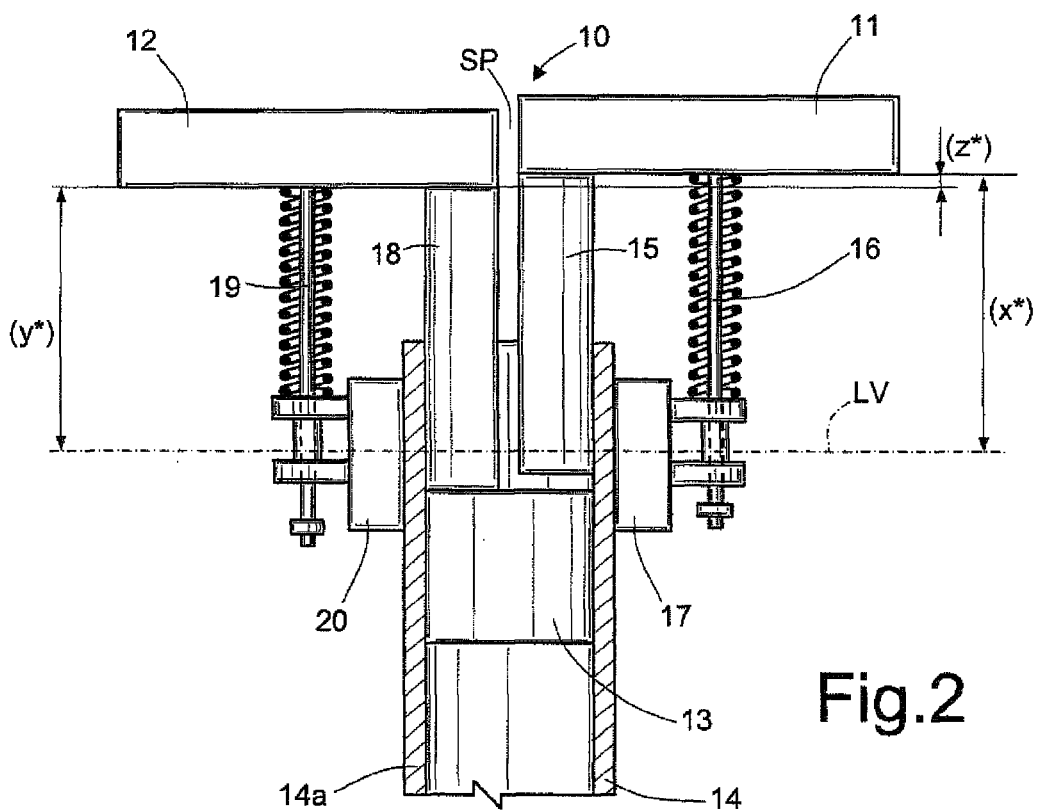
FIG. 2 shows a longitudinal section of the FIG. 1 pedal arrangement in a second normal-brake position.

As shown in FIG. 2, master cylinder 13 may be activated by both pedals 11, 12 of pedal arrangement 10; in which case, only normal braking, e.g. of the four drive wheels (not shown) of the tractor, is effected. In the FIG. 2 position, the SBF function is therefore idle.

As shown in FIG. 2, when braking normally (i.e. when the SBF function, as stated, is idle), the distances between pedals 11, 12 and fixed reference line LV are altered (now (X*) and (Y*) respectively) but not to the same degree.

In other words, since it is practically impossible for the driver to press both pedals 11, 12 in the same way and with the same force, the value of (X*), when braking the tractor normally, will normally never be exactly equal to (Y*).

The electronic control system (connected to electronic central control unit CL), however, allows a small difference (Z*) between the two distances (Y*) and (X*), and still interprets the signal as indicating the driver's intention to brake normally (i.e. with the SBF function deactivated).

Figure 3:
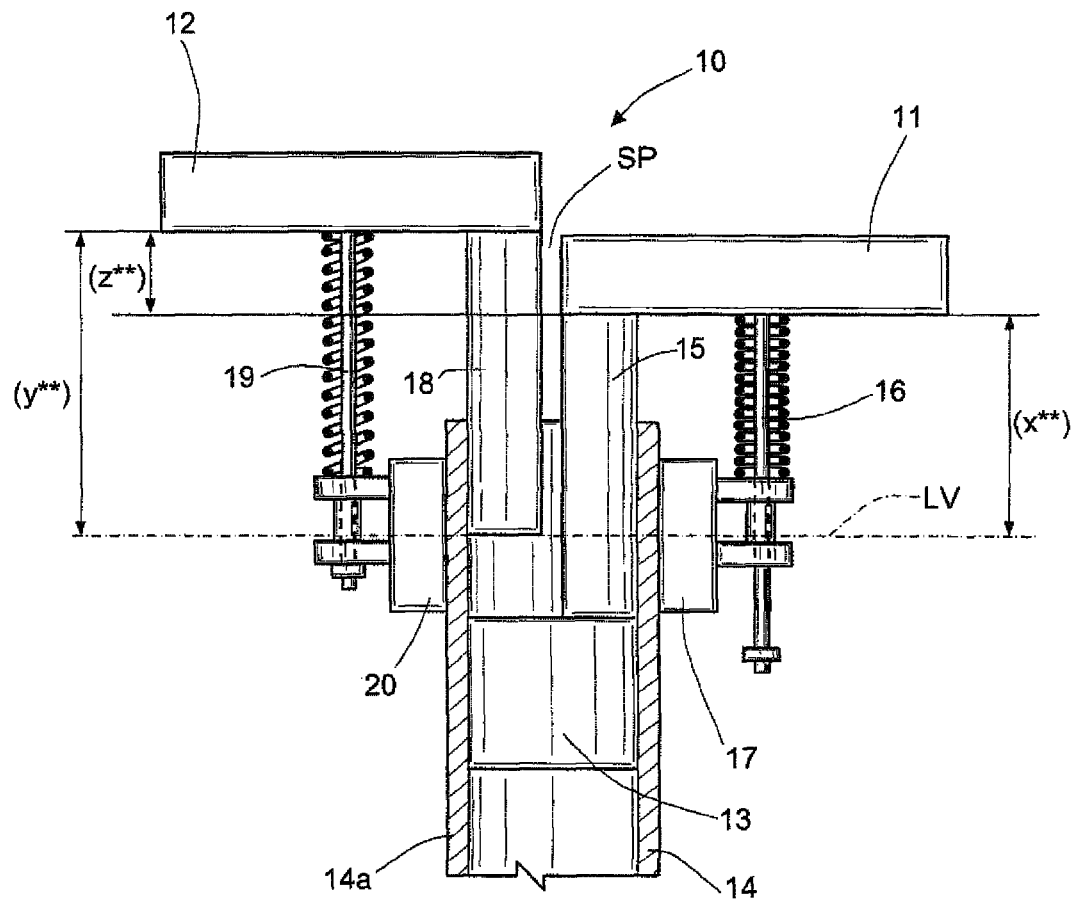
FIG. 3 shows a longitudinal section of the FIGS. 1 and 2 pedal arrangement in a third position with the steer-by-braking function (SBF) engaged.

As shown in FIG. 3, if the difference, however, between distances (X) and (Y) increases over and above a given threshold value, the electronic system interprets this as the driver's intention to turn right, for example, as shown in fact in FIG. 3. (The difference may be positive or negative; in the FIG. 3 configuration, it is negative, since the value of (Y) is greater than (X).

The same also applies when the driver turns left; in which case, the difference between the value of (X) and (Y) is positive.

To improve steering safety, a pedal requisite may advantageously, though not necessarily, be introduced, in the sense that, to activate the steer-by-braking (SBF) function, not only must the distance between pedals 11 and 12 exceed a given threshold value, but the pedal not involved in the steering operation must also be in the rest position shown in FIG. 1.

Another function may also be implemented, whereby the SBF function is disabled automatically when the speed of the tractor exceeds a given predetermined threshold value.

The main advantages of the present invention are as follows:
- it solves the problem of the driver neglecting to connect the two brake pedals integrally prior to the vehicle reaching high speed;
- it provides for applying the steer-by-braking function (SBF) to electronic (e.g. ABS) brake systems; and
- one master cylinder serves both brake/steer-by-braking pedals.

The invention claimed is:

1. A brake and steer-by-braking pedal arrangement for tractors; the pedal arrangement comprising:
    a right pedal and a left pedal operating synchronously or diachronically; and
    at least one hydraulic or pneumatic circuit connected to an actuator activated by at least one of said pedals;
    said actuator comprising only one master cylinder and
    a detector connected electronically to an electronic central control unit; said detector configured for determining the distance between said pedals and a fixed reference line positioned below said pedals, said electronic central control unit configured for determining from data received from said detector, whether or not to activate the steer-by-braking function.

2. A pedal arrangement as claimed in claim 1, wherein said fixed reference line is a horizontal reference line.

3. A pedal arrangement as claimed in claim 2, wherein if the two pedals are pressed simultaneously by the driver, below a given difference between two distances of the two pedals from said fixed reference line, the electronic central control unit activates the normal brake function.

4. A pedal arrangement as claimed in claim 2, wherein over and above a given difference between two distances of the two pedals from said fixed reference line, the electronic central control unit activates the steer-by-braking function in one of two directions.

5. A pedal arrangement as claimed in claim 4, wherein the electronic central control unit determines that the pedal not involved in the steering operation is in its rest position before activating the steer-by-braking function.

6. A pedal arrangement as claimed in claim 1, wherein said detector comprises at least a potentiometer.

7. A pedal arrangement as claimed in claim 1, wherein said detector comprises any mechanical, electromechanical or electronic device capable of determining the instantaneous position of the two pedals, or the distance between them, or the distance between them and a reference line.

8. An electronically controlled ABS brake system comprising:
    a right pedal and a left pedal operating synchronously or diachronically; and
    at least one hydraulic or pneumatic circuit connected to an actuator activated by at least one of said pedals;
    said actuator comprising only one master cylinder;
    a detector connected electronically to an electronic central control unit; said detector configured for determining the distance between said pedals and a fixed reference line positioned below said pedals, said electronic central control unit configured for determining from data received from said detector, whether or not to activate the steer-by-braking function.

9. An electronically controlled ABS brake system as claimed in claim 8, wherein said fixed reference line is a horizontal line.

10. An electronically controlled ABS brake system as claimed in claim 9, wherein said fixed reference line is positioned along a top of a master cylinder.

11. An electronically controlled ABS brake system as claimed in claim 2, wherein said fixed reference line is positioned along a top of a master cylinder.

* * * * *